United States Patent
Mixter et al.

(10) Patent No.: US 11,503,372 B2
(45) Date of Patent: Nov. 15, 2022

(54) AUTOMATION AND RECOMMENDATION BASED ON DEVICE CONTROL PROTOCOLS

(71) Applicant: Google LLC, Mountain View, CA (US)

(72) Inventors: Kenneth Mixter, Los Altos Hills, CA (US); Marci Meingast, San Francisco, CA (US); Jennifer Yick, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/903,606

(22) Filed: Jun. 17, 2020

(65) Prior Publication Data
US 2021/0400348 A1    Dec. 23, 2021

(51) Int. Cl.
    *H04N 21/466*    (2011.01)
    *H04N 21/482*    (2011.01)
    (Continued)

(52) U.S. Cl.
    CPC ... *H04N 21/4668* (2013.01); *H04N 21/43615* (2013.01); *H04N 21/43635* (2013.01); *H04N 21/4532* (2013.01); *H04N 21/4826* (2013.01)

(58) Field of Classification Search
    CPC .......... H04N 21/4668; H04N 21/4826; H04N 21/43635; H04N 21/43615; H04N 21/4532; H04N 21/44008; H04N 21/466; H04N 21/4662; H04N 21/44213; H04N 21/251; H04N 21/42204; H04N 21/436; G06N 20/00; G06N 5/022; G06N 5/025;
    (Continued)

(56) References Cited

U.S. PATENT DOCUMENTS 10,416,615 B2    9/2019  Lentzitzky
2016/0259308 A1  9/2016  Fadell
                 (Continued)

FOREIGN PATENT DOCUMENTS

EP    3525205 A1      8/2019
WO    2019191082 A2  10/2019

OTHER PUBLICATIONS

All in' on AI, Part 5: Bixby creates a customized home experience for everyday life, Samsung Electronics Co., Ltd., May 17, 2018.
(Continued)

*Primary Examiner* — Alazar Tilahun
(74) *Attorney, Agent, or Firm* — Kilpatrick Townsend & Stockton LLP

(57) ABSTRACT

Systems and techniques are provided for automation and recommendation based on device control protocols. HDMI-CEC device control data may be received from a connected electronic device that may be connected to an electronic display device. The HDMI-CEC device control data may be based on a HDMI-CEC device control signal from the electronic display device. Signals may be received from sensor devices located in a same structure as the electronic display device. The HDMI-CEC device control data and signals from the sensor devices may be input to the machine learning system. The machine learning system may generate a control signal for a device. The control signal may be sent to the device to be implemented by the device.

20 Claims, 11 Drawing Sheets

(51) Int. Cl.
*H04N 21/45* (2011.01)
*H04N 21/436* (2011.01)
*H04N 21/4363* (2011.01)

(58) Field of Classification Search
CPC ..... G06N 5/04; H04L 12/2814; H04L 12/282; H04L 12/2829
See application file for complete search history.

(56) References Cited

U.S. PATENT DOCUMENTS

| | | | |
|---|---|---|---|
| 2017/0070842 A1* | 3/2017 | Kulp | H04L 12/2803 |
| 2017/0288894 A1* | 10/2017 | Marino | H04L 12/2809 |
| 2018/0077233 A1* | 3/2018 | Chang | H04L 67/1048 |
| 2018/0091845 A1* | 3/2018 | Lee | H04N 21/41265 |
| 2018/0234715 A1* | 8/2018 | Aggarwal | H04N 21/44204 |
| 2019/0251835 A1 | 8/2019 | Yu | |
| 2019/0268177 A1* | 8/2019 | Li | G10L 15/30 |
| 2020/0092611 A1* | 3/2020 | Sokolov | H04N 21/4756 |

OTHER PUBLICATIONS

Extended European Search Report for App. No. EP21180058.6, dated Oct. 25, 2021, 7 pages.

\* cited by examiner

AUTOMATION AND RECOMMENDATION BASED ON DEVICE CONTROL PROTOCOLS

BACKGROUND

Electronic devices may use a control protocol such as HDMI-Consumer Electronics Control (CEC) for sending and receiving control signals to and from other electronic devices. This may allow for simplified control of the electronic devices. HDMI-CEC protocol may allow for control signals to be sent between devices with HDMI ports connected by HDMI cables. A single input device, such a as a remote control, for an electronic device using the control protocol may be used to control other electronic devices that use the control protocol.

BRIEF SUMMARY

According to an embodiment of the disclosed subject matter, HDMI-CEC device control data may be received from a connected electronic device that may be connected to an electronic display device. The HDMI-CEC device control data may be based on a HDMI-CEC device control signal from the electronic display device. Signals may be received from sensor devices located in a same structure as the electronic display device. The HDMI-CEC device control data and signals from the sensor devices may be input to the machine learning system. The machine learning system may generate a control signal for a device. The control signal may be sent to the device to be implemented by the device.

The machine learning system may generate a recommendation for controlling a second device. The HDMI-CEC device control data may be input to the machine learning system. The recommendation for controlling the second device may be sent to a user computing device.

A selection of a control for the recommendation for controlling the second device may be received from the user computing device. A control signal may be generated for the second device. The control signal may be based on the recommendation for controlling the second device. The control signal may be sent to the second device to be implemented by the second device.

The machine learning system may generate a recommendation for content to be displayed on the electronic display device. The recommendation may be based on times at which HDMI-CEC device control data based on HDMI-CEC device control signals from the electronic display device are received. The recommendation for content may be sent to a user computing device.

The control signal may cause electronic communications intended for a user computing device to be displayed on the electronic display device.

The control signal may cause a video signal from the device to be displayed on the electronic display device.

The HDMI-CEC device control signal may include a signal according to HDMI-CEC indicating a status of the electronic display device.

The machine learning system may implement online learning.

According to an embodiment of the disclosed subject matter, a means for receiving HDMI-CEC device control data from a connected electronic device that is connected to an electronic display device, wherein the HDMI-CEC device control data is based on a HDMI-CEC device control signal from the electronic display device, means for receiving signals from sensor devices located in a same structure as the electronic display device, a means for generating, with a machine learning system, a control signal for a device, wherein the HDMI-CEC device control data and signals from the sensors is input to the machine learning system, a means for sending the control signal to the device to be implemented by the device, a means for generating, with the machine learning system, a recommendation for controlling a second device, wherein the HDMI-CEC device control data is input to the machine learning system, a means for sending the recommendation for controlling the second device to a user computing device, a means for receiving, from the user computing device, a selection of a control for the recommendation for controlling the second device, a means for generating a control signal for the second device, wherein the control signal is based on the recommendation for controlling the second device, a means for sending the control signal to the second device to be implemented by the second device, and a means for generating, with the machine learning system, a recommendation for content to be displayed on the electronic display device, wherein the recommendation is based on times at which HDMI-CEC device control data based on HDMI-CEC device control signals from the electronic display device are received, a means for sending the recommendation for content to a user computing device, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
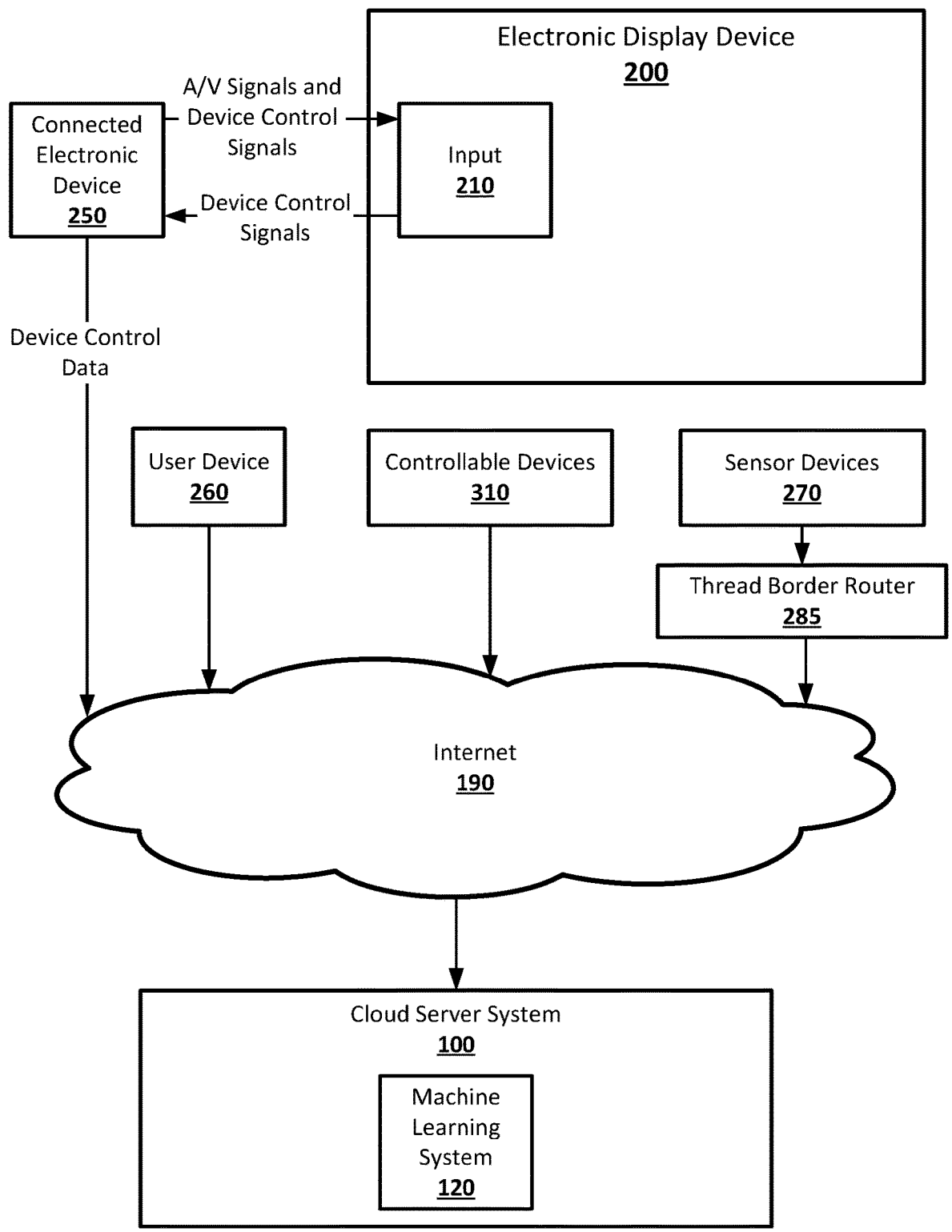
FIG. 1 shows an example arrangement suitable for automation and recommendation based on device control protocols according to an implementation of the disclosed subject matter.

According to embodiments disclosed herein, automation and recommendation based on device control protocols may allow for device control signals sent by an electronic display device using a device control protocol such as HDMI-CEC to be used to automate the operation of other devices and to generate recommendations for a user. HDMI-CEC device control signals generated by an electronic display device using HDMI-CEC may be received by a connected electronic device that uses HDMI-CEC. The connected electronic device may send HDMI-CEC device control data based on the device control signal to a machine learning system. The machine learning system may use the device control data to control devices in the same environment as the electronic display device, automating their operation, or to make recommendations to a user on ways in which to control devices in the environment. The devices may be controlled based on recommendations made by the machine learning system using the device control data for the electronic display device, and/or the presence, location, and/or behavior of a user of the electronic display device. The machine learning system may use the device control data to recommend content to the user. The machine learning system may also use the device control data for an electronic display device to determine whether to route various types of electronic communication to the electronic display device.

An electronic display device in an environment may use a device control protocol such as HDMI-CEC. The electronic display device may be any suitable type of display device, such as, for example, a television or monitor. HDMI-CEC may allow the electronic display device to control and be controlled by a connected electronic device. The connected electronic device may be connected to the electronic display device at an input or output of the electronic device. For example, an HDMI cable may be used to connect an HDMI output of an A/V receiver to an HDMI input of a television, and may allow the A/V receiver and television to communicate with and control each other. The connected electronic device may be any suitable electronic device, such as, for example, an A/V receiver, game console, or media player such as a cable box, physical media player, or streaming media player. The communication between electronic devices connected using HDMI-CEC may include, for example, the status of the electronic devices, including when they are turned on and turned off.

The electronic display device may be in an environment, or structure, such as, for example, a home, office, apartment, condo, or other structure, that may include a combination of enclosed and open spaces. The environment or structure may be a environment, which may include, for example, a hub computing device. The hub computing device may be any suitable computing device for managing sensors and other systems, such as automation systems, within the structure. The hub computing device may be, for example, a controller for a environment. For example, the hub computing device may be or include a smart thermostat, security hub, or other computing device located within the environment. The hub computing device also may be another device within the environment or may be a separate computing device dedicated to managing the environment that may be connected to devices in the environment through, for example, the Internet. The hub computing device may be connected, through any suitable wired, wireless, local, and wide area connections, to a number of sensors and controllable devices distributed throughout an environment or structure. For example, the hub computing device, sensors, and other components of the environment may be connected in a mesh network. Some of the sensors may, for example, be motion sensors, including passive infrared sensors used for motion detection, light sensors, cameras, microphones, entryway sensors, smart light switches, as well as mobile device scanners that may use Bluetooth, WiFi, RFID, or other wireless devices as sensors to detect the presence of devices such as smartphones, tablets, laptops, or fobs. Sensors may be distributed individually or may be combined with other sensors in sensor devices. For example, a sensor device may include a low power motion sensor and a light sensor, or a microphone and a camera, or any other combination of available sensors.

The connected electronic device may be in communication with the hub computing device. For example, the connected electronic device may be connected to the hub computing device locally through a wired or wireless network in the environment or structure, including a WiFi or Bluetooth connection, or may be connected to the hub computing device through a wide area connection, such as a connection to the Internet, for example, through a cellular connection or through a wired or wireless connection to a router or gateway. The connected electronic device may receive device control signals that use HDMI-CEC from the electronic display device, and may send device control data based on the device control signal to the hub computing device. The device control data may be based on the HDMI-CEC protocol and HDMI-CEC device control signals. For example, when the electronic display device is turned on, whether through use of device control signals through HDMI-CEC or through, for example, a remote control or power button for the electronic display device, a device control signal may be sent using HDMI-CEC to the connected electronic device indicating that the electronic display device has been turned on. Based on this device control signal, the connected electronic device may send device control data indicating that the electronic display device has been turned on to the hub computing device. For example, a user may use a remote control to turn on a television. The television may use HDMI-CEC protocols to communicate to a streaming media player connected to one of the television's HDMI inputs that the television has been turned on. The media player may then send HDMI-CEC device control data indicating that the television has been turned on to the hub computing device for the environment, for example, home, that includes the television and the streaming media player. The connected electronic device may perform any suitable conversion, interpretation, or translation of the device control signal to generate the device control data, or may pass the device control signal to the hub computing device as the device control data.

Device control data received at the hub computing device may be used as input to a machine learning system. The machine learning system may be any suitable machine learning system for outputting control signals and recommendations based on device control data and data from other sensors. The machine learning system may be, for example, a Bayesian network, artificial neural network, support vector machine, classifier of any type, or any other suitable statistical or heuristic machine learning system type. The machine learning system may be trained online using device control data, data from other sensors in the structure or environment, and any other suitable data, including, for example, data from a user's electronic devices and data from online accounts that the user has given the machine learning system access to. The machine learning system may output recommendations about the usage of and/or control signals for the electronic display device or other devices in the environment. The control signals may be used to control devices throughout the structure or environment and to route various types of electronic communications to the electronic display device. The recommendations may be used by the hub computing device to provide recommendations to a user of ways to control devices in the environment, including the electronic display device, instead of controlling the devices directly. The recommendations may be provided, for example, through a smartphone or other electronic device that may be associated with the user and connected to the hub computing device through any suitable connection.

For example, upon receiving device control data that indicates that a television has been turned on, the machine learning system may generate control signals and recommendations for various devices in the environment or structure. The machine learning system may, for example, generate control signals that may dim lights in the same room as the television, or may generate a recommendation that the lights be dimmed that may be sent to a smartphone of the user. The recommendation may include, for example, a control that may appear on the smartphone of the user that, if selected by the user, may implement control signals to dim lights. The recommendation may be sent to a smartphone that may be determined to be in proximity to the television based on, for example, location data from the smartphone or data from other sensors in the environment or structure that may indicate the presence, location, and/or behavior of the user.

The control signals generated by the machine learning system may control any devices in the environment or structure in any suitable manner. For example, the control signals may control lights, sensors, security devices, locks, A/V devices, HVAC systems, motorized devices such as blinds, and other such controllable device. The device control data may act as presence or location signal for the user, which the machine learning system may use to determine the appropriate devices to generate control signals for. For example, an electronic display device being turned on in a particular room may result in the machine learning system generating control signals that retrieve temperature data from temperature sensors in the room and operate HVAC systems in the environment or structure to change the temperature in that room based on the user being located in the room, for example, warming or cooling the room to a preset or learned temperature for the user. The control signals generated by the machine learning system may turn on, turn off, and dim lights. The control signals generated by the machine learning system may also route various forms of electronic communication to the electronic display device that has been turned on and away from an electronic display device that has been turned off. For example, the machine learning system may generate control signals that may cause notifications, text messages, incoming voice and video calls, and/or video or other data from security cameras and other security devices through the environment or structure, to be routed to an electronic display device that has been turned on as indicated by device control data from the electronic display device.

The machine learning system may generate recommendations along with, or instead of, control signals. For example, the machine learning system may recommend to a user ways in which to control lighting, HVAC systems, and electronic communication routing based on device control data that indicates that an electronic display device has been turned on. The recommendations may be sent to an electronic device of the user, such as, for example, a smartphone. For example, the machine learning system may determine, based on other sensors in the environment or structure, or based on location data for an electronic device, the identity of a user that is nearest to the electronic display device that has been turned on. The hub computing device may transmit recommendations from the machine learning system to an electronic device associated with that user. The recommendations may include controls that may allow the user to implement the recommendations. For example, a recommendation to route voice and video calls that are incoming to the user's smartphone to the electronic display device may include a control that, if selected by the user, may cause the hub computing device to implement the recommendation and route incoming voice and video calls to the electronic display device.

The machine learning system may generate a recommendation of content to be displayed on the electronic display device. The recommendation of content may be generated based on a schedule learned by the machine learning system for the electronic display device based on device control data for the electronic display device. For example, the machine learning system may implement online learning, and may learn that a television is turned on at 7:30 pm and turned off at 10:30 pm on most weekdays from device control data for the television received over any period of suitable period of time. The machine learning system may predict that the television will be turned on during this time period in the future, and may generate recommendations for content to be watched during this time period. The recommendations of content may be generated and sent to a user's electronic device at any suitable time. For example, the recommendations may be generated just before or during the time period in which the machine learning system predicts the electronic display device will be in use, for example, in response to device control data indicating that the electronic display device is turning or has been turned on, or may be generated in advance of the predicted time and in the absence of device control data for the electronic display device. The recommendations may be for content from any suitable source, including broadcast, cable, fiber, and IP television services, streaming media services, and media hosting websites.

Device control data may be received from any number of electronic display devices. The control signals generated by the machine learning system may be specific to different one of the electronic display devices, so that control signals and recommendations based on device control data indicating a first electronic display device is turning on may be different from control signals and recommendations based on device control data indicating a second electronic display device is turning on.

FIG. 1 shows an example arrangement suitable for automation and recommendation based on device control protocols according to an implementation of the disclosed subject matter. An electronic display device 200 may be connected to a connected electronic device 250. The electronic display device 200 may be any suitable display device for video, such as, for example, a television or monitor. The electronic display device 200 may include any suitable number of inputs, such as the input 210, and outputs of any suitable type, using any suitable protocols for sending and receiving data. The input 210 may be any suitable type of input to the electronic display device 200, and may include a hardware input port. For example, the input 210 may be an HDMI input that may include a hardware HDMI input port.

The connected electronic device 250 may be any suitable electronic device that may be connected to an input or output of the electronic display device 200, such as, for example, an A/V receiver, game console, or media player such as a cable box, physical media player, streaming media player, or other external device. The connected electronic device 250 may be connected to the input 210 of the electronic display device 200. For example, the connected electronic device 250 may include an HDMI output port which may be connected to the input 210 using an HDMI cable, or may be directly plugged-in to the input 210. In some implementations, the input 210 may be a wireless input to the electronic display device 200, and the connected electronic device 250 may be connected wirelessly to the input 210. In some implementations, the connected electronic device 250 may be built-in to the electronic display device 200.

The connected electronic device 250 may send any suitable combination of A/V signals and device control signals to the input 210 of the electronic display device 200. The A/V signals may be any suitable combination of audio and video signals. The device control signals may be any suitable signals for controlling the electronic display device 200 using any suitable HDMI-CEC. For example, the device control signals may be sent according to the CEC protocol over and HDMI connection. The device control signals may, for example, cause the electronic display device 200 to turn on, turn off, change the volume of audio output, change which input of the electronic display device 200 displays video signals from, or perform any other suitable action.

The electronic display device 200 may send any suitable device control signals to the connected electronic device 250 that is connected to the input 210. The device control signals may be any suitable signals for controlling or sending data to the connected electronic device 250 using any suitable HDMI-CEC. For example, the device control signals may be sent according to the CEC protocol over an HDMI connection. The device control signals may, for example, cause the connected electronic device 250 to turn on, turn off, start, stop, or pause audio and/or video content being sent to the input 210 by the connected electronic device 250, or perform any other suitable action. The device control signals may also include data indicating that status of the electronic display device 200. For example, when the electronic display device 200 is turned on, or awakens from a low-power or sleep mode, device control signals may be sent from the electronic display device 200 to the connected electronic device 250 indicating that the electronic display device 200 is on, or awake. When the electronic display device 200 is turned off, or enters a low-power or sleep state, device control signals may be sent from the electronic display device 200 to the connected electronic device 250 indicating that the electronic display device 200 is turning off, or entering a low-power or sleep state, before it does so. This may allow the connected electronic device 250 to be aware of changes in the status of the electronic display device 200 caused by controlling of the electronic display device 200 by the connected electronic device 250, any other connected electronic device, or a remote control, hard or soft input buttons, or any other device or control that allows for control of the electronic display device 200.

HDMI-CEC device control data may be sent to a cloud server system 100. The cloud server system 100 may be any suitable computing device or system for cloud computing, such as, for example, any number of computers 20 as described in FIG. 10, for implementing a machine learning system 130. The cloud server system 100 may be, for example, cloud computing system including a server system that provides cloud computing services using any suitable computing devices connected in any suitable manner distributed over any area. The machine learning system 120 may be any suitable combination of hardware and software for implementing a machine learning system that may generate control signals and recommendations for the control of devices in the environment or structure.

The device control data sent to the cloud server system 100 may be based, on or may include, the device control signals received by the connected electronic device 250 from the electronic display device 200. The device control data may be the device control signals themselves, or may be data derived, interpreted, or translated from the device control signals, such as, for example, a status of the electronic display device 200. For example, when the electronic display device 200 is turned on, the electronic display device 200 may send a device control signal according to HDMI-CEC to the connected electronic device 250, which may send that device control signal, without modifying it, to the cloud server system 100 as device control data. The connected electronic device 250 may also modify the device control signal into a format that may be more suitable for the cloud server system 100 and send the modified device control signal to the cloud server system 100 as device control data. The connected electronic device 250 may derive the status of the electronic display device 200, for example, that the electronic display device 200 has been turned on, from the device control signals and send the status to the cloud server system 100 as device control data. The device control data may be sent to the cloud server system 100 through, for example, Internet 190.

The cloud server system 100 may receive signals from other devices throughout the structure or environment. For example, the cloud server system 100 may receive signals from sensors, such as the sensor devices 270. The sensor devices 270 may be, for example, any combination of motion sensors, cameras, microphones, light sensors, contact sensors, tilt sensors, WiFi or Bluetooth detectors, or any other suitable sensor types. The signals may include, for example, signals and other data generated by the sensor devices 270 based on active output from the sensors or lack out active output from the sensors. For example, a motion sensor may generate active output when it detects motion, and may have a lack of active output when it does not detect motion. The signals from the sensor device 270 may include, for example, audio and video signals, signals indicating light levels, signals indicating detection or non-detection of motion, signals whether entryways are open, closed, opening, closing, or experiencing any other form of displacement, signals indicating the current climate conditions within and outside of the environment, smoke and carbon monoxide detection signals, and signals indicating the presence or absence of occupants in the environment based on Bluetooth or WiFi signals and connections from electronic devices associated with occupants or fobs carried by occupants. The signals from the sensor devices 270 may be sent to the cloud server system 100 through, for example, through a thread border router 285 that may collect signals from the sensor devices 270 and send them to the cloud server system 100 through the Internet 190.

The cloud server system 100 may also receive signals from controllable devices 310 in the environment. The controllable devices 310 may include, for example, lights, sensors, security devices, locks, A/V devices, HVAC systems, motorized devices such as blinds, and other such controllable device. Signals from the controllable devices 310 may include, for example, signals indicating the current state of the controllable devices 310. The signals from the controllable devices 310 may be sent to the cloud server system 100 through, for example, the Internet 190.

The cloud server system 100 may also receive signals from a user computing device 260. The user computing device 260 may be any suitable computing device, such as, for example, a smartphone, tablet, laptop, or smartwatch or other wearable computing device. The cloud server system 100 may receive signals from the user computing device 260, such as, for example, signals indicating the location of the user computing device 260 within the structure or environment. The signals may be received directly from the user computing device 260, which may be connected to the cloud server system 100, for example, through a user account on the cloud server system 100 that the user is logged-in to on the user computing device 260.

The cloud server system 100 may include a machine learning system 120. The machine learning system 120 may be any suitable combination of hardware and software for implementing a machine learning system that may generate control signals and recommendations for the control of devices in the environment or structure. The machine learning system 120 may be, for example, a Bayesian network, artificial neural network, support vector machine, classifier of any type, or any other suitable statistical or heuristic machine learning system type. The machine learning system 120 may receive, as input, signals from the signal receiver, including device control data received by the cloud server system 100, and may output control signals for controlling devices in the environment or structure, recommendations to a user for controlling devices in the environment or structure, and recommendations of content for a user. The machine learning system 120 be any suitable type of machine learning system, and may include multiple machine learning systems which may operate independently or in conjunction with one another. For example, the machine learning system 120 may include a first machine learning system that generates control signals and recommendations for control of devices, and a second machine learning system that generates recommendations of content for a user. The machine learning system 120 may be implemented using any suitable type of learning, including, for example, supervised or unsupervised online learning.

The cloud server system 100 be able to control the controllable devices 310 of the environment. For example, the cloud server system 100 may send control signals to the controllable devices 310 through the Internet 190. The cloud server system 100 may, for example, be able to send control signals to sensors, light switches, remote controlled locks, audio and visual devices, HVAC systems, and any other of the controllable devices 310. For example, the cloud server system 100 may be able to turn lights on and off in respond to control signals from other components of the cloud server system 100, such as the machine learning system 120. The cloud server system 100 may, for example, interpret or translate control signals output by the machine learning system 120, which may be generic, into control signals for the specific devices of the environment before sending the control signals to the devices.

Figure 2:
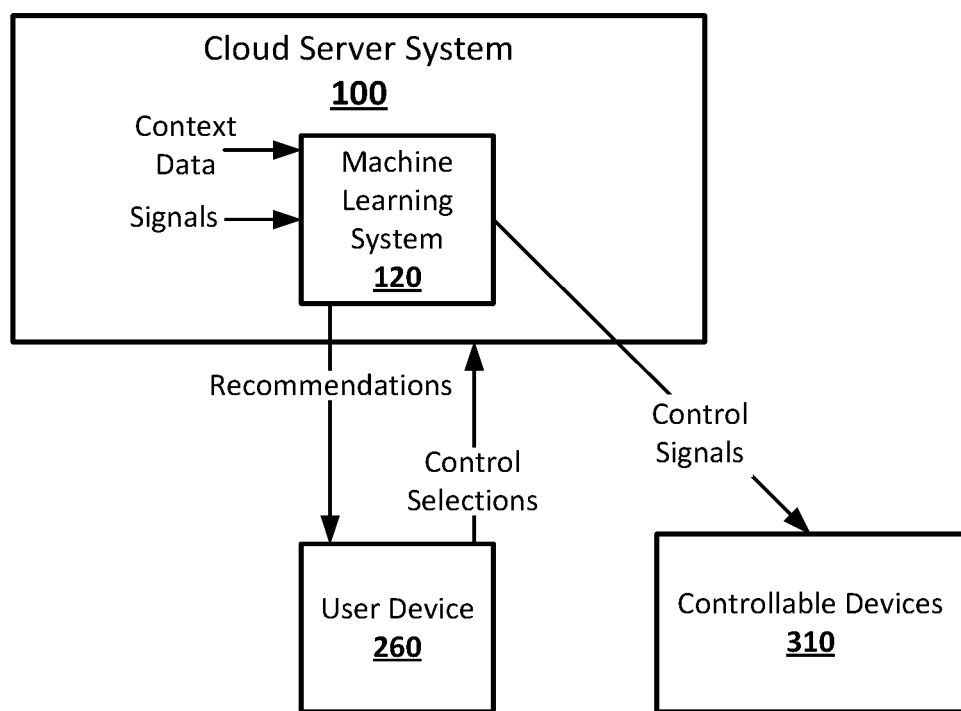
FIG. 2 shows an example arrangement suitable for automation and recommendation based on device control protocols according to an implementation of the disclosed subject matter.

FIG. 2 shows an example arrangement suitable for automation and recommendation based on device control protocols according to an implementation of the disclosed subject matter. Signals received by the cloud server system 100, including device control data for the electronic display device 200, may be sent from the cloud server system 100 to the machine learning system 120. The signals may be input to machine learning systems of the machine learning system 120. The signals may, for example, be converted into an appropriate format for input into the machine learning system 120, such as, for example, into a vector format for input into a neural network. The machine learning system 120 may also receive context data, for example, through other components of the hub computing device 300. The context data may include, for example, the time of day, day of week, geo-location data, and any other suitable data about the environment or structure or context in which the signals from the sensor devices 270, the user computing device 260, the controllable devices 310, and connected electronic device 250, are received.

The machine learning system 120 may output control signals and recommendations based on the signals input from the cloud server system 100, including the device control data for the electronic display device 200. The control signals output by the machine learning system 120 may be for any number of the controllable devices 310 which may be located through the environment or structure. The control signals output by the machine learning system 120 may be based on, for example, the device control data, signals from the sensor devices 270, signals from the user computing device 260, current status of the controllable devices 310, and known locations for the sensor devices 270, the electronic display device 200, and controllable devices 310. The control signals may also be based on any patterns learned by the machine learning system 120 from past inputs of device control data, signals from the sensor devices 270, signals from the user computing device 260, and statuses of the controllable devices 310. For example, the machine learning system 120 may learn, from past inputs, that the user turns off lights in the same room as the electronic display device 200 when turning on the electronic display device 200, and may thus generate control signals for turning off those lights when the device control data indicates that the electronic display device 200 has been turned on and the status of the lights indicates that they are currently on. The machine learning system 120 may generate any number of control signals for the hub computing device 300, any number of the controllable devices 310, or any other controllable device or system.

The control signals generated and output by the machine learning system 120 may control the controllable devices 310 in any suitable manner, for example, turning any of the controllable devices 310 on or off, changing settings and operating modes of the controllable devices 310, and causing the controllable devices 310 to perform any suitable actions of which they may be capable. The control signals may also control, for example, the hub computing device 300, causing the hub computing device 300 to route signals received from any of the sensor devices 270 to the electronic display device 200. For example, the control signals may cause the hub computing device 300 to route video received from security cameras to the electronic display device 200. The control signals may also control, for example, the routing of electronic communications intended for the user computing device 260. For example, the control signals may cause incoming voice and video calls and text or other messaging application messages to be routed to the electronic display device 200. Calls and messages may be routed in any suitable manner. For example, the user computing device 260 may be logged-in to the same cloud computing account as the connected electronic device 250. The control signals may cause the cloud computing system for the cloud computing account to route incoming calls and messages to the user computing device 260, which may be received at the cloud computing system, to the connected electronic device 250, which may be able to present audio and video for calls and display text for messages using the electronic display device 200 and any built-in or connected audio equipment.

The control signals generated and output by the machine learning system 120 may be to the appropriate ones of the controllable devices 310. The cloud server system 100 may modify, translate, or interpret the control signals as necessary to control the controllable devices 310 in accordance with the control signals. For example, the machine learning system 120 may output generic control signals which may need to be translated into a format understood by the controllable devices 310.

The recommendations generated and output by the machine learning system 120 may be recommendations for any suitable action that may be taken by a user, and may be related to any number of the controllable devices 310, the hub computing device 300, or the cloud computing system. The recommendations output by the machine learning system 120 may be based on, for example, the device control data, signals from the sensor devices 270, signals from the user computing device 260, current status of the controllable devices 310, and known locations for the sensor devices 270, the electronic display device 200, and controllable devices 310. The recommendations may also be based on any patterns learned by the machine learning system 120 from past inputs of device control data, signals from the sensor devices 270, signals from the user computing device 260, and statuses of the controllable devices 310. For example, the machine learning system 120 may learn, from past inputs, that the user turns off lights in the same room as the electronic display device 200 when turning on the electronic display device 200, and may thus generate a recommendation to the user that the user turn off those lights when the device control data indicates that the electronic display device 200 has been turned on and the status of the lights indicates that they are currently on. The recommendation to turn off the lights in the same room as the electronic display device 200 may be sent to the user computing device 260, which may, for example, present the user with a control that they may use to implement the recommendation. Selecting the control for the recommendation on the user computing device 260 may send an instruction to the cloud server system 100 to turn off the lights in the same room as the electronic display device 200. The machine learning system 120 may generate any number of recommendations for controlling the hub computing device 300, any number of the controllable devices 310, or any other controllable device or system.

The recommendations generated and output by the machine learning system 120 may recommend controlling any of the controllable devices 310 in any suitable manner, for example, turning any of the controllable devices 310 on or off, changing settings and operating modes of the controllable devices 310, and causing the controllable devices 310 to perform any suitable actions of which they may be capable. The recommendations may also recommend controlling, for example, the cloud server system 100, causing the cloud server system 100 to route signals received from any of the sensor devices 270 to the electronic display device 200. For example, the recommendations may recommend controlling the cloud server system 100 to route video received from security cameras to the electronic display device 200. The recommendations may also recommend, for example, changing the routing of electronic communications intended for the user computing device 260. For example, the recommendations may recommend causing incoming voice and video calls and texts or other messaging application messages to be routed to the electronic display device 200.

The recommendations generated and output by the machine learning system 120 may also include recommendations of content to display on the electronic display device 200. The recommendations of content may be generated based on a scheduled learned by the machine learning system 120 for the electronic display device 200 based on device control data for the electronic display device 200. For example, the machine learning system 120 may generate and send to the user computing device 260 recommendations for content to be displayed on the electronic display device 200 during time periods when the electronic display device 200 is usually on. The recommendations may be for any content available through any suitable content provider or mechanism, including, for example, streaming video services and broadcast, cable, and fiber television services. The recommendations may be generated and sent to a user computing device 260 at any suitable time, including times when the electronic display device 200 is not turned on.

The recommendations generated and output by the machine learning system 120 may be sent to the user computing device 260 in any suitable manner. The recommendations may, for example, appear on the user computing device 260 as notifications that may include controls for implementing the recommendations, or may appear as controls within an application for the environment running on the user computing device 260. Selections of controls for implementing recommendations from the machine learning system 120 made by the user on the user computing device 260 may be sent to the cloud server system 100. The cloud server system 100 may send control signals to implement the recommendations that the user has selected to implement to the appropriate ones of the controllable devices 310, or may use control signals to change the operation of the cloud server system 100 in order to route signals and electronic communications in accordance with the control signals. The controller 130 may modify, translate, or interpret the control signals as necessary to control the controllable devices 310 in accordance with the control signals. For example, the machine learning system 120 may output generic control signals which may need to be translated into a format understood by the controllable devices 310.

Figure 3:
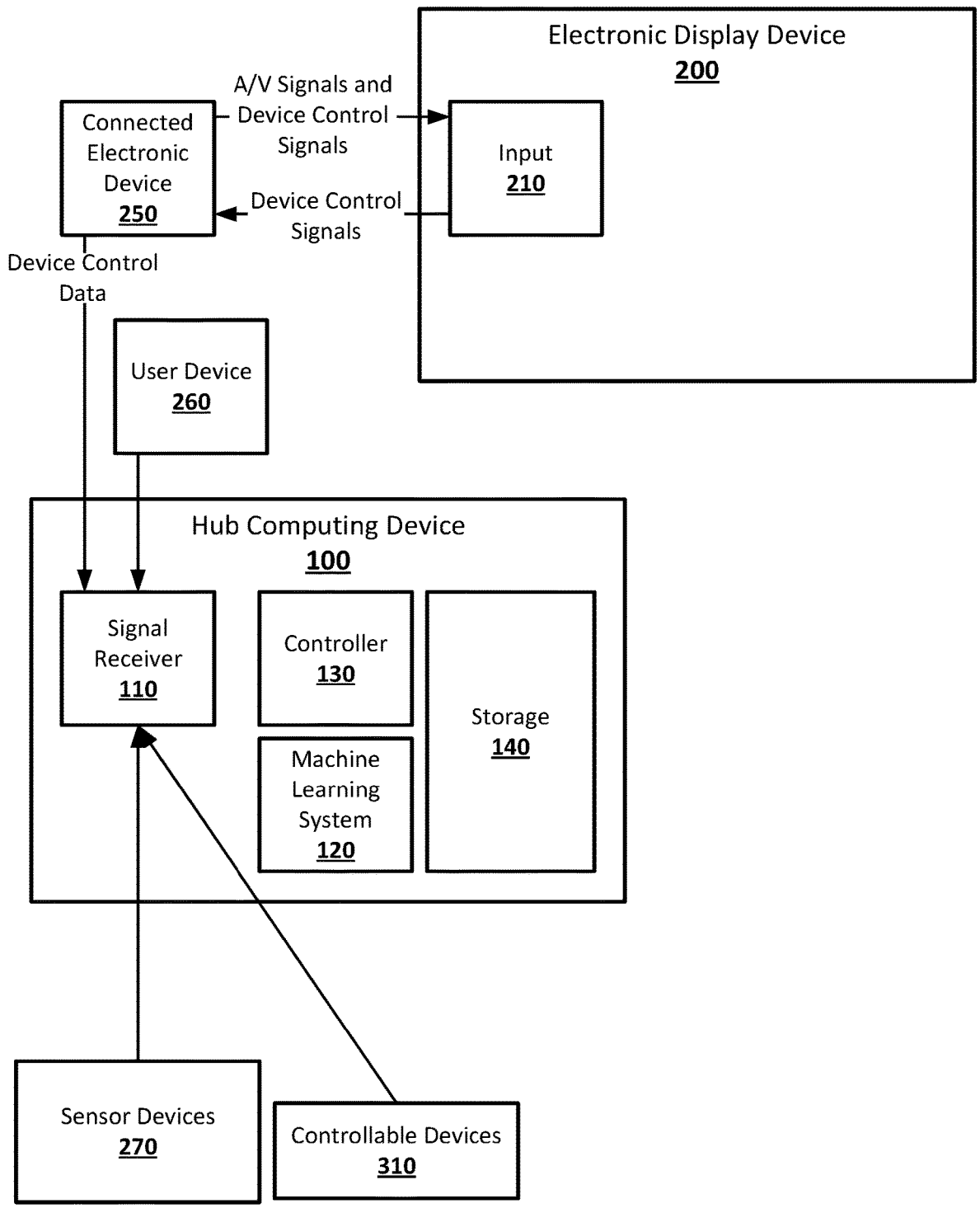
FIG. 3 shows an example arrangement suitable for automation and recommendation based on device control protocols according to an implementation of the disclosed subject matter.

FIG. 3 shows an example system suitable for automation and recommendation based on device control protocols according to an implementation of the disclosed subject matter. In some implementations, a hub computing device 300 may be used instead of, or in conjunction with, the cloud server system 100. The hub computing device 300 may include a signal receiver 110, the machine learning system 120, a controller 130, and storage 140. The hub computing device 300 may be any suitable device, such as, for example, a computer 20 as described in FIG. 10, for implementing the signal receiver 110, the machine learning system 120, the controller 130, and the storage 140. The hub computing device 300 may be, for example, a controller 73 as described in FIG. 8. The hub computing device 300 may be a single computing device, or may include multiple connected computing devices, and may be, for example, a smart thermostat, other smart sensor, smartphone, tablet, laptop, desktop, smart television, smart watch, or other computing device that may act as a hub for an environment or structure, which may include a security system and automation functions. The signal receiver 110 may be any suitable combination of hardware or software for receiving signals generated by sensors and other electronic devices that may be part of the environment and may be connected to the hub computing device 300. The controller 130 may be any suitable combination of hardware and software for controlling devices of the environment. The storage 140 may be any suitable combination of hardware and software for implementing non-volatile storage.

The hub computing device 300 may be any suitable computing device for acting as the hub of a environment. For example, the hub computing device 300 may be a single smart device, such as a thermostat or security hub, multiple devices, may be connected to various sensors throughout an environment as well as to various systems within the environment, such as HVAC systems, or it may be another device within the environment. The hub computing device 300 may include any suitable hardware and software interfaces through which a user may interact with the hub computing device 300. For example, the hub computing device 300 may include a touchscreen display, or may include web-based or application-based interface that can be accessed using another computing device, such as a smartphone, tablet, or laptop. The hub computing device 300 may be located within the same environment as the environment it controls or may be located offsite. For example, the hub computing device 300 may be wholly or partially hosted on the cloud server system 100. An onsite hub computing device 300 may use computation resources from other computing devices throughout the environment or connected remotely, such as, for example, as part of the cloud server system 100.

The hub computing device 300 may include a signal receiver 110. The signal receiver 110 may be any suitable combination of hardware and software for receiving signals from sensors and electronic devices connected to the hub computing device 300. For example, the signal receiver 110 may receive signals from any sensors distributed throughout an environment, either individually or as part of sensor devices. The signal receiver 110 may receive any suitable signals from the sensor devices 270, controllable devices 310, and user device 260. The signal receiver 110 may receive signals that include device control data from connected electronic devices that are connected to electronic display devices in the environment. The device control data may be based on device control signals transmitted between connected electronic devices and electronic display devices using HDMI-CEC. The signal receiver 110 may pass received signals to other components of the hub computing device 300 for further processing and for storage. For example, the signal receiver 110 may pass received signals to the machine learning system 120. The signal receiver 110 may also be able to receive, or to associate with a received signal, an identification for the sensor from which the signal was received. This may allow the signal receiver 110 to distinguish which signals are being received from which sensors throughout the environment.

The hub computing device 300 may include the machine learning system 120. The machine learning system 120 may receive, as input, signals from the signal receiver 110, including HDMI-CEC device control data received by the signal receiver 110, and may output control signals for controlling devices in the environment or structure, recommendations to a user for controlling devices in the environment or structure, and recommendations of content for a user.

The hub computing device 300 may include a controller 130. The controller 130 may be any suitable combination of hardware and software for controlling the controllable devices 310. The controller 130 may, for example, be able to send control signals to sensors, light switches, remote controlled locks, audio and visual devices, HVAC systems, and any other controllable devices that may be connected to the hub computing device. For example, the controller 130 may be able to turn lights on and off in respond to control signals from other components of the hub computing device 300, such as the machine learning system 120. The controller 130 may, for example, interpret or translate control signals output by the machine learning system 120, which may be generic, into control signals for the specific devices of the environment before sending the control signals to the devices.

The storage 140 may be any suitable storage hardware connected to the hub computing device 300. For example, the storage 140 may be a component of the hub computing device, such as a flash memory module or solid state disk, or may be connected to the hub computing device 300 through any suitable wired or wireless connection. The storage 140 may be a local storage, i.e., within the environment within which the hub computing device 300 operates, or it may be remote to the hub computing device 300. The storage 140 may store weights, models, or other data structures used by the machine learning system 120.

Figure 4A:
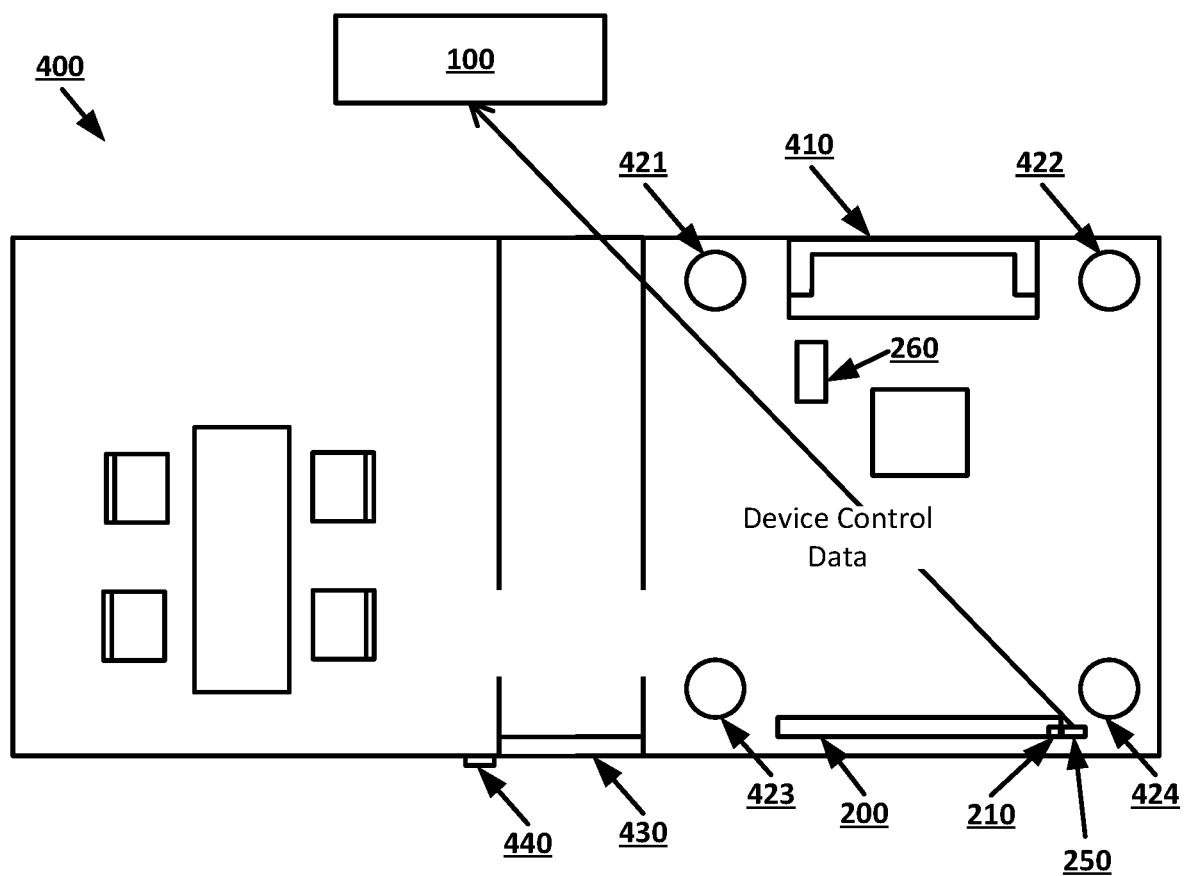
FIG. 4A shows an example environment suitable for automation and recommendation based on device control protocols according to an implementation of the disclosed subject matter.

FIG. 4A shows an example environment suitable for automation and recommendation based on device control protocols according to an implementation of the disclosed subject matter. A structure 400 may include a room 410. The room 410 may include the electronic display device 200 with the input 210, the connected electronic device 250 connected to the input 210, controllable light fixtures 421, 422, 423, and 424, and the user computing device 260. The structure 400 may also include a front door 430 and a front door camera 440.

When the electronic display device 200 is turned on, a device control signal may be sent according to HDMI-CEC to the connected electronic device 250 through the input 210. The connected electronic device 250 may send HDMI-CEC device control data based on the received control signal to the cloud server system 100. The cloud server system 100. The device control data may be input to the machine learning system 120 of the cloud server system 100 along with signals received at the cloud server system 100 from sensor devices, such as the sensor devices 270, which may be distributed through the structure 400, the controllable devices 310, the user device 260, and along with context data.

Figure 4B:
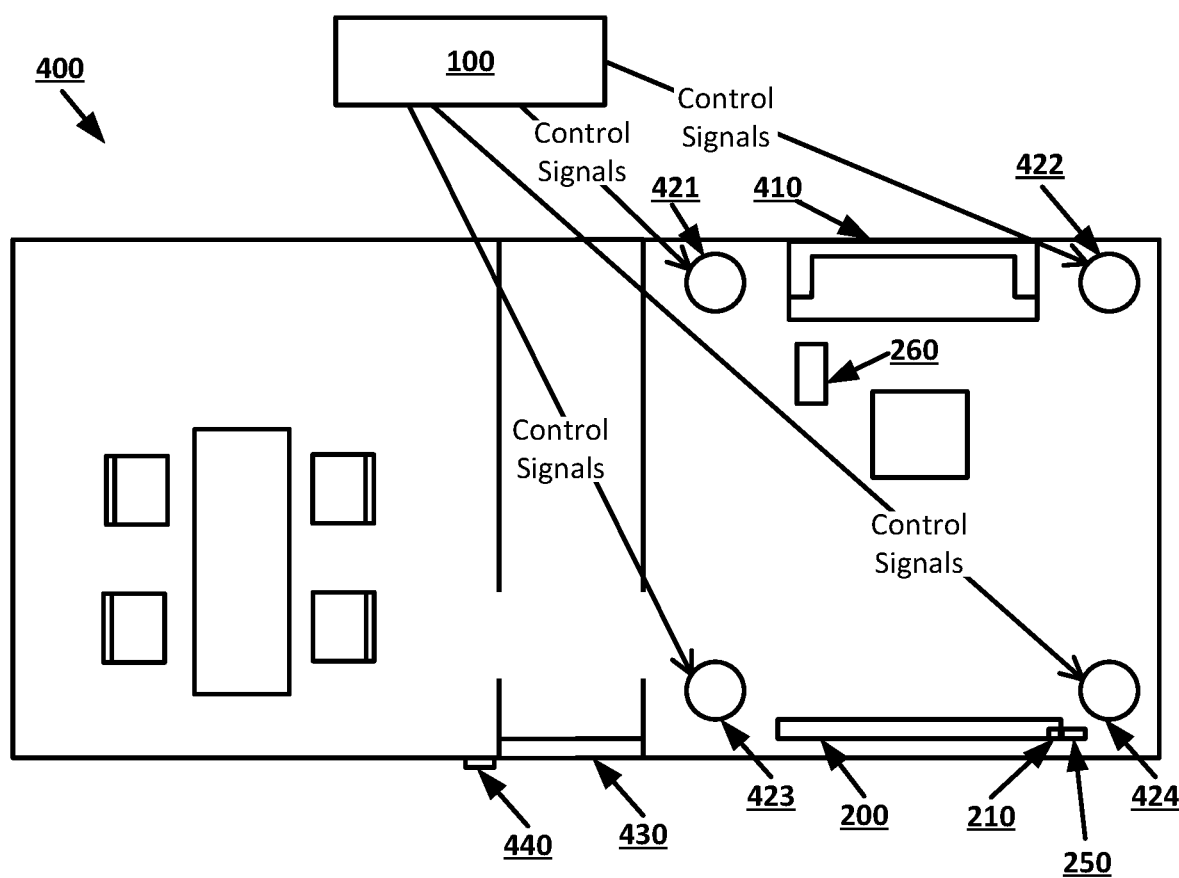
FIG. 4B shows an example environment suitable for automation and recommendation based on device control protocols according to an implementation of the disclosed subject matter.

FIG. 4B shows an example environment suitable for automation and recommendation based on device control protocols according to an implementation of the disclosed subject matter. The machine learning system 120 of the cloud server system 100 may generate control signals based on the device control data from the electronic display device 200 and send the control signals to the appropriate devices in the structure 400. For example, the control signals may be sent from the cloud server system 100 to the controllable light fixtures 421, 422, 423, and 424, causing them to dim the lights.

Figure 4C:
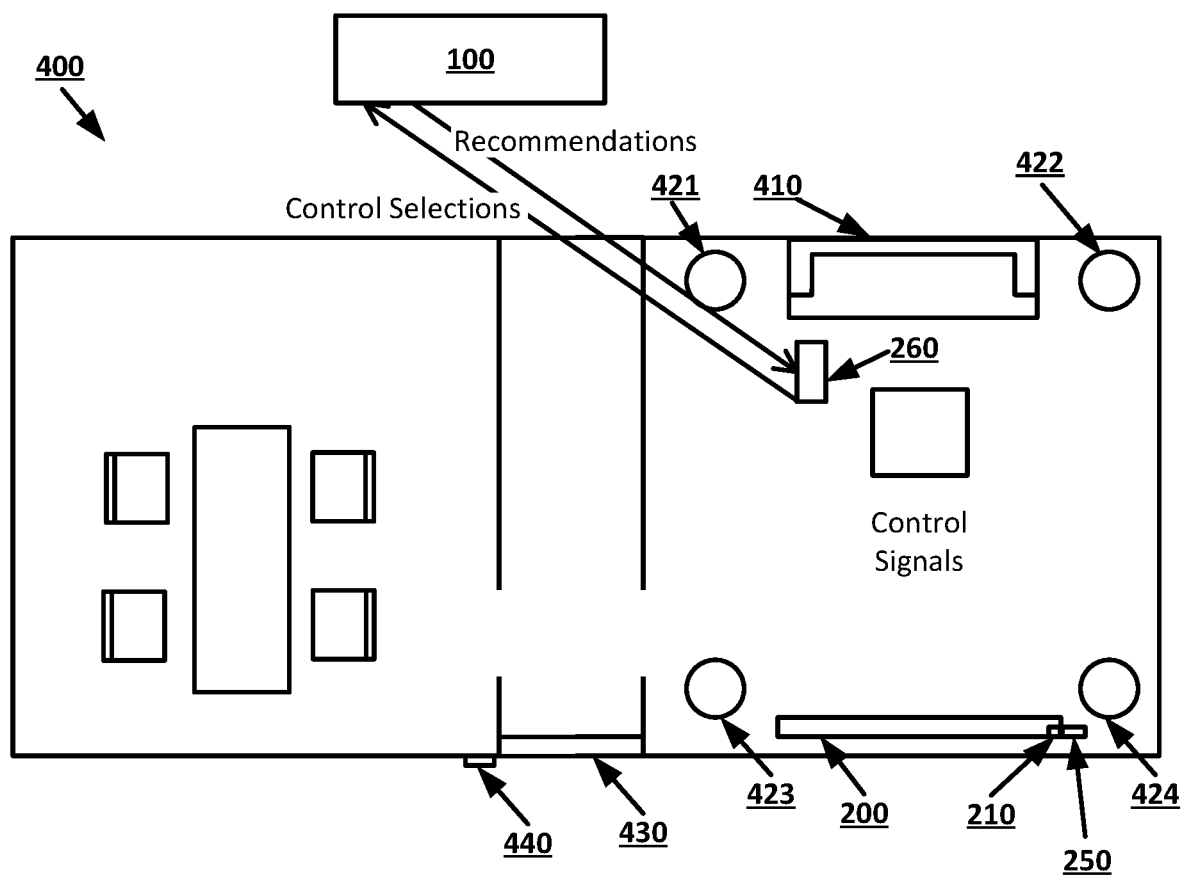
FIG. 4C shows an example environment suitable for automation and recommendation based on device control protocols according to an implementation of the disclosed subject matter.

FIG. 4C shows an example environment suitable for automation and recommendation based on device control protocols according to an implementation of the disclosed subject matter. The machine learning system 120 of the cloud server system 100 may generate recommendations based on the device control data from the electronic display device 200 and send the recommendations to the user computing device 260. The recommendations may include, for example, recommendations for changing the operating status of devices in the structure 400 such as the controllable light fixtures 421, 422, 423, and 424. The recommendations may appear on the user computing device 260 with a control that the user may select to implement the recommendations. Control selections made by the user on the user computing device 260 may be sent back to the cloud server system 100, which may then send out control signals to the appropriate devices in the structure 400 to implement the recommendations. The recommendations may also include, for example, recommendations of content to be displayed on the electronic display device 200, and may include controls that may be selected on the user computing device 260 to cause the recommended content to be displayed on the electronic display device 260.

Figure 4D:
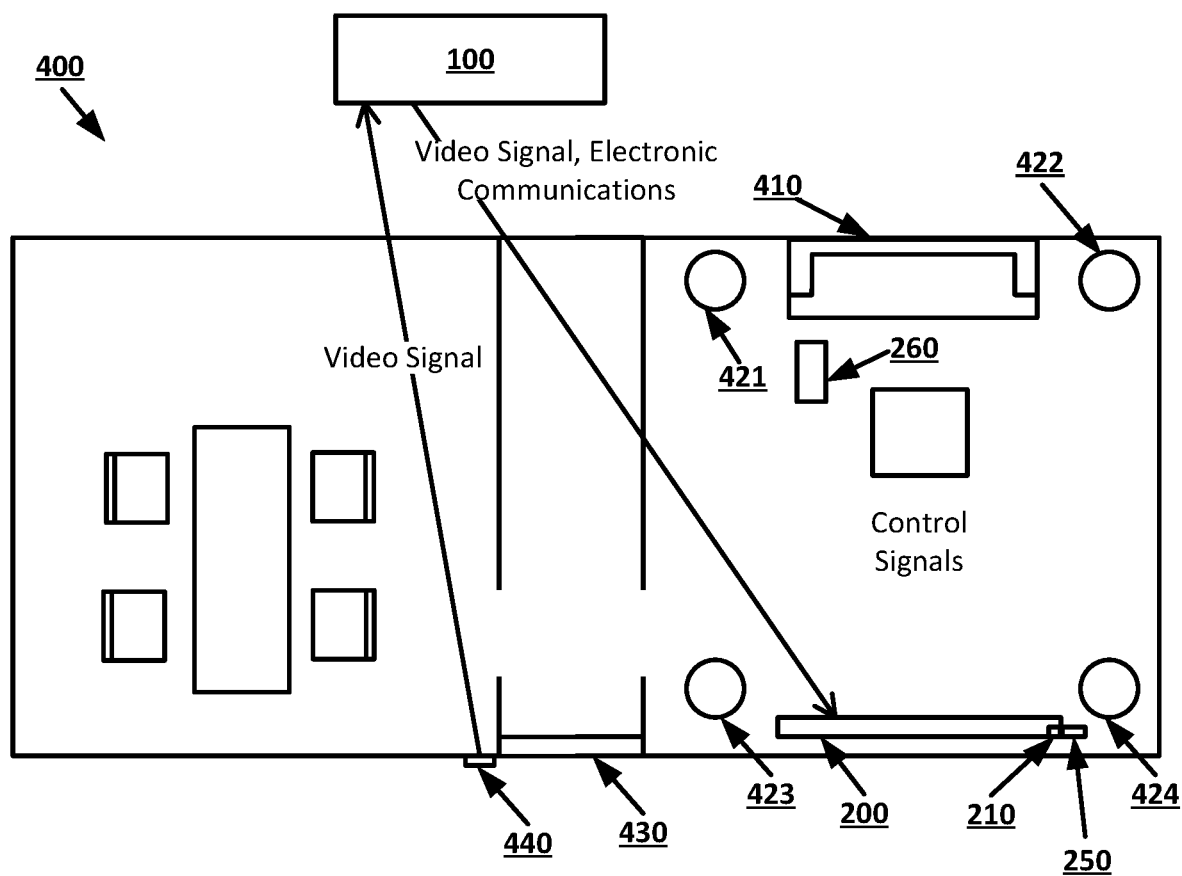
FIG. 4D shows an example environment suitable for automation and recommendation based on device control protocols according to an implementation of the disclosed subject matter.

FIG. 4D shows an example environment suitable for automation and recommendation based on device control protocols according to an implementation of the disclosed subject matter. The cloud server system 100 may route a video signal received from the front door camera 440 to the electronic display device 200. The cloud server system 100 may also route electronic communications intended for the user computing device 260, such as voice and video calls and text or other messaging application messages, to the electronic display device 200. The routing of the video signal and electronic communications may be changed by control signals output by the machine learning system 120 based on the input device control data, or may be changed by control signals that implement a recommendation generated by the machine learning system 120, sent to the user computing device 260, and selected by the user on the user computing device 260.

Figure 5:
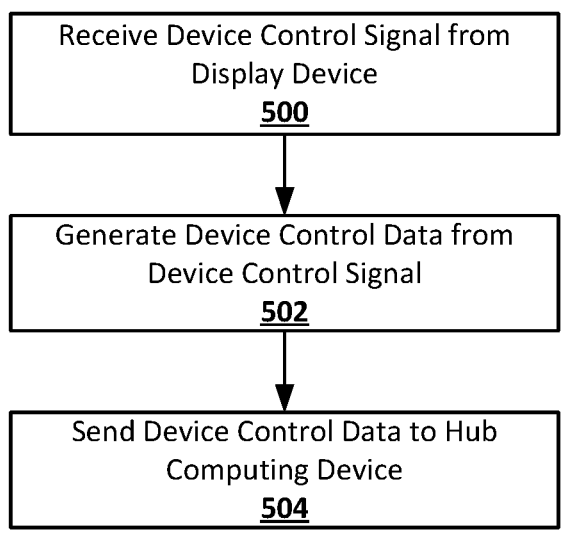
FIG. 5 shows an example of a process suitable for automation and recommendation based on device control protocols according to an implementation of the disclosed subject matter.

FIG. 5 shows an example of a process suitable for automation and recommendation based on device control protocols according to an implementation of the disclosed subject matter. At 500, a device control signal may be received. For example, the connected electronic device 250 may receive a device control signal from the electronic display device 200. The connected electronic device 250 may be connected to the input 210 of the electronic display device 200, which may be, for example, an HDMI input. The HDMI-CEC device control signal may be sent according to any suitable HDMI-CEC, including, for example, the CEC protocol. The electronic display device 200 may be, for example, a television or monitor, and the connected electronic device 250 may be, for example, a streaming media player, game console, A/V receiver, or other electronic device that may be connected to a display device and may provide data for content, such as video and audio signals, to be played back by the display device. The device control signal may indicate the status of the electronic display device 200, for example, indicating that the electronic display device 200 is turning on or off in response to any suitable input to the electronic display device 200.

At 502, device control data may be generated from the device control signal. For example, the connected electronic device 250 may convert, translate, or interpret the device control signal into a format which may be usable by, for example, the hub computing device 300. The HDMI-CEC device control data may, for example, indicate the status of the electronic display device 200 in a format different from HDMI-CEC. In some implementations, the device control signal may be used as the device control data without conversion, interpretation, or translation. The connected electronic device 250 may act as pass-through for the device control signal from the electronic display device 200 to the cloud server system 100.

At 504, the device control data may be sent to the cloud server system. For example, the connected electronic device 250 may send the device control data to the cloud server system 100, using any suitable wired or wireless connection. For example, the connected electronic device 250 may be connected to a WiFi network that may be connected to the Internet 190, and may send the device control data through the WiFi network to the Internet 190 and the cloud server system 100. The connected electronic device 250 may be logged-in to an account on the cloud server system 100, and the device control data may be sent through the account on the cloud server system 100.

Figure 6:
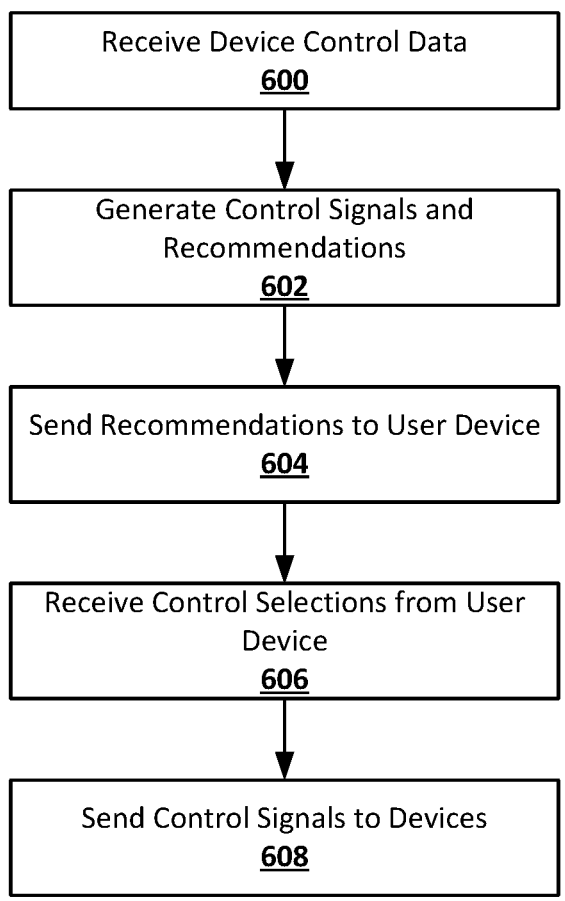
FIG. 6 shows an example of a process suitable for automation and recommendation based on device control protocols according to an implementation of the disclosed subject matter.

FIG. 6 shows an example of a process suitable for automation and recommendation based on device control protocols according to an implementation of the disclosed subject matter. At 600, device control data may be received. For example, HDMI-CEC device control data may be received by the cloud server system 100 from the connected electronic device 250. Device control data may be received from any number of connected electronic devices, connected to any number of electronic display devices, in an environment or structure. The device control data may be received in any suitable manner, including through any suitable wired or wireless and local or wide area network.

At 602, control signals and recommendations may be generated. For example, device control data received at the cloud server system 100 may be input to the machine learning system 120 along with other signals received by the cloud server system 100 from the sensor devices 270 and the controllable devices 310, data from the user computing device 260, and context data. The machine learning system 120 may generate and output control signals and recommendations, which may be based on, for example, online training of the machine learning system 120. The control signals generated by the machine learning system 120 may be for any number of controllable devices 310 which may be located through the environment or structure. The control signals may be for controlling the controllable devices 310 to perform any suitable action or operation or change the status or settings of the controllable devices 310 in any suitable manner. The machine learning system 120 may generate any number of control signals for any number of the controllable devices 310, or any other controllable device or system, or the cloud server system 100. The recommendations generated and output by the machine learning system 120 may recommend controlling any of the controllable devices 310, or any other device, such as the cloud server system 100 and the user computing device 260, in any suitable manner. The recommendations generated and output by the machine learning system 120 may also include recommendations of content that a user may want to watch on the electronic display device 200. Recommendations of content to display on the electronic display device 200 may be based on, for example, predictions by the machine learning system 120 of times that the electronic display device 200 will be in use. These times may be, for example, time at which device control data based on device control signals from the electronic display device 200 have been received in the past. The recommendations of content may be generated without the input of current device control data into the machine learning system 120. For example, the machine learning system 120 may generate recommendations of content based on input context data.

At 604, recommendations may be sent to the user computing device. For example, the cloud server system 100 may send any recommendations output by the machine learning system 120 to the user computing device 260. The cloud server system 100 may determine which user computing device to send recommendations to based on, for example, proximity of the user computing device to the electronic display device 200 which generated the device control signal on which the device control data sent to the cloud server system 100 was based. The recommendations may be sent in any suitable manner, and may appear on the user computing device 260 in any suitable format. For example, the recommendations may appear as notifications with controls that the user may select to implement the recommendations, or may appear within an application that may be used to control and monitor the environment.

At 606, control selections may be received from the user computing device. For example, the user may select any number of the controls that appear for the recommendations sent to the user computing device 260. The controls may be selected in any suitable manner, including, for example, through voice commands, typed commands, or through using a touch screen of the user computing device 260 to select the controls for the recommendations displayed on the touch screen. The control selections made using the user computing device 260 may be sent to the cloud server system 100 in any suitable manner.

At 608, control signals may be sent to devices. For example, the cloud server system 100 may send the control signals generated by the machine learning system 120 and control signals to implement recommendations for which a control selection has been received from the user computing device 260, to the appropriate devices, such as, for example, the controllable devices 310. The control signals may be implemented on the devices that receive them, for example, turning devices on and off, changing the operating status or settings of devices, or otherwise controlling the operation of the devices in any suitable manner. The devices to which control signals are sent may be devices that are in proximity to, or are related to the operation of, the electronic display device 200. The control signals may also be sent to components of the cloud server system 100, for example, to route video from security cameras or electronics communications intended for the user computing device 260 to the electronic display device 200.

HDMI-CEC device control data may be received from a connected electronic device that may be connected to an electronic display device. The HDMI-CEC device control data may be based on a HDMI-CEC device control signal from the electronic display device. Signals may be received from sensor devices located in a same structure as the electronic display device. The HDMI-CEC device control data and signals from the sensor devices may be input to the machine learning system. The machine learning system may generate a control signal for a device. The control signal may be sent to the device to be implemented by the device.

The machine learning system may generate a recommendation for controlling a second device. The HDMI-CEC device control data may be input to the machine learning system. The recommendation for controlling the second device may be sent to a user computing device.

A selection of a control for the recommendation for controlling the second device may be received from the user computing device. A control signal may be generated for the second device. The control signal may be based on the recommendation for controlling the second device. The control signal may be sent to the second device to be implemented by the second device.

The machine learning system may generate a recommendation for content to be displayed on the electronic display device. The recommendation may be based on times at which HDMI-CEC device control data based on HDMI-CEC device control signals from the electronic display device are received. The recommendation for content may be sent to a user computing device.

The control signal may cause electronic communications intended for a user computing device to be displayed on the electronic display device.

The control signal may cause a video signal from the device to be displayed on the electronic display device.

The HDMI-CEC device control signal may include a signal according to HDMI-CEC indicating a status of the electronic display device.

The machine learning system may implement online learning.

A connected electronic device may be connected to an electronic display device. A computing device of a cloud server system may be configured to receive HDMI-CEC device control data from the connected electronic device that is connected to an electronic display device, wherein the HDMI-CEC device control data is based on a HDMI-CEC device control signal from the electronic display device, receive signals from one or more sensor devices located in a same structure as the electronic display device, generate, with a machine learning system of the computing device of a cloud server system, a control signal for a device, wherein the HDMI-CEC device control data and signals from the sensor devices are input to the machine learning system, and send the control signal to the device to be implemented by the device.

The computing device of a cloud server system may be further configured to generate, with the machine learning system, a recommendation for controlling a second device, wherein the HDMI-CEC device control data is input to the machine learning system, and send the recommendation for controlling the second device to a user computing device.

The computing device of a cloud server system may be further configured to receive, from the user computing device, a selection of a control for the recommendation for controlling the second device, generate a control signal for the second device, wherein the control signal is based on the recommendation for controlling the second device, send the control signal to the second device to be implemented by the second device.

The computing device of a cloud server system may be further configured to generate, with the machine learning system, a recommendation for content to be displayed on the electronic display device, wherein the recommendation is based on times at which HDMI-CEC device control data based on HDMI-CEC device control signals from the electronic display device are received, and send the recommendation for content to a user computing device The control signal may cause electronic communications intended for a user computing device to be displayed on the electronic display device.

The control signal may cause a video signal from the device to be displayed on the electronic display device.

The HDMI-CEC device control signal may include a signal according to HDMI-CEC indicating a status of the electronic display device.

The machine learning system may implement online learning.

According to an embodiment of the disclosed subject matter, a means for receiving HDMI-CEC device control data from a connected electronic device that is connected to an electronic display device, wherein the HDMI-CEC device control data is based on a HDMI-CEC device control signal from the electronic display device, means for receiving signals from sensor devices located in a same structure as the electronic display device, a means for generating, with a machine learning system, a control signal for a device, wherein the HDMI-CEC device control data and signals from the sensors is input to the machine learning system, a means for sending the control signal to the device to be implemented by the device, a means for generating, with the machine learning system, a recommendation for controlling a second device, wherein the HDMI-CEC device control data is input to the machine learning system, a means for sending the recommendation for controlling the second device to a user computing device, a means for receiving, from the user computing device, a selection of a control for the recommendation for controlling the second device, a means for generating a control signal for the second device, wherein the control signal is based on the recommendation for controlling the second device, a means for sending the control signal to the second device to be implemented by the second device, and a means for generating, with the machine learning system, a recommendation for content to be displayed on the electronic display device, wherein the recommendation is based on times at which HDMI-CEC device control data based on HDMI-CEC device control signals from the electronic display device are received, a means for sending the recommendation for content to a user computing device, are included.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 7:
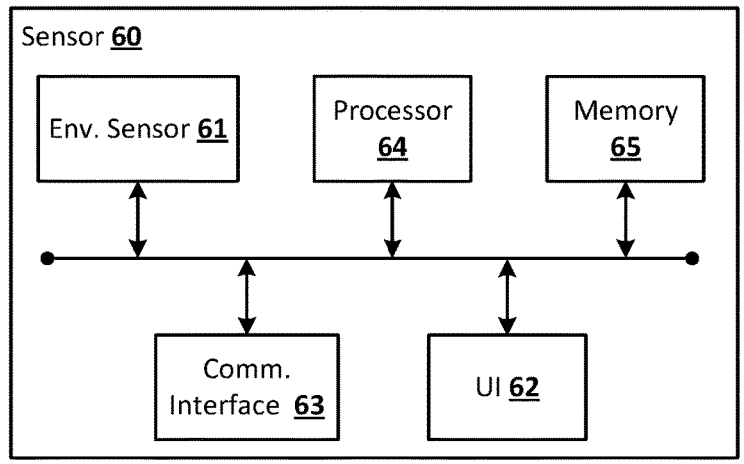
FIG. 7 shows a computing device according to an embodiment of the disclosed subject matter.

A sensor may include hardware in addition to the specific physical sensor that obtains information about the environment. FIG. 7 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 8:
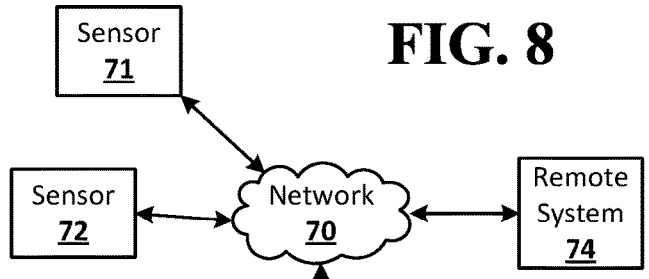
FIG. 8 shows a system according to an embodiment of the disclosed subject matter.
Figure 9:
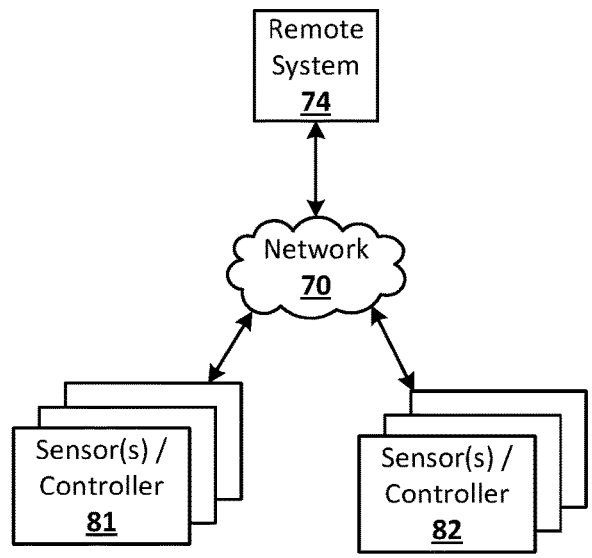
FIG. 9 shows a system according to an embodiment of the disclosed subject matter.

FIG. 8 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 300 may be an example of a controller 73 and the sensors 210 may be examples of sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 8 may be an example of a smart-home environment. The depicted smart-home environment may include a structure, a house, office building, garage, mobile home, or the like. The devices of the environment, such as the sensors 71, 72, the controller 73, and the network 70 may be integrated into a smart-home environment that does not include an entire structure, such as an apartment, condominium, or office space.

The environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 8 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 8.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 8, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 8, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 8 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 8. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 8 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 8 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 8 can be communicatively coupled to each other via the network 70, and to the controller 73 and/or remote system 74 to provide security, safety, and/or comfort for the environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 9 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 10:
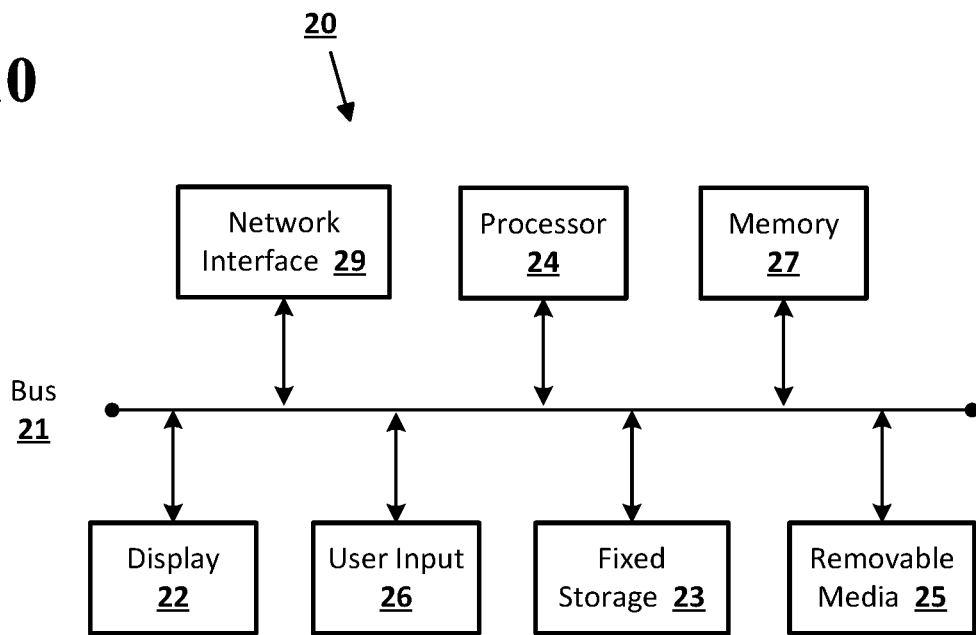
FIG. 10 shows a computer according to an embodiment of the disclosed subject matter.

Embodiments of the presently disclosed subject matter may be implemented in and used with a variety of computing devices. FIG. 10 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 11:
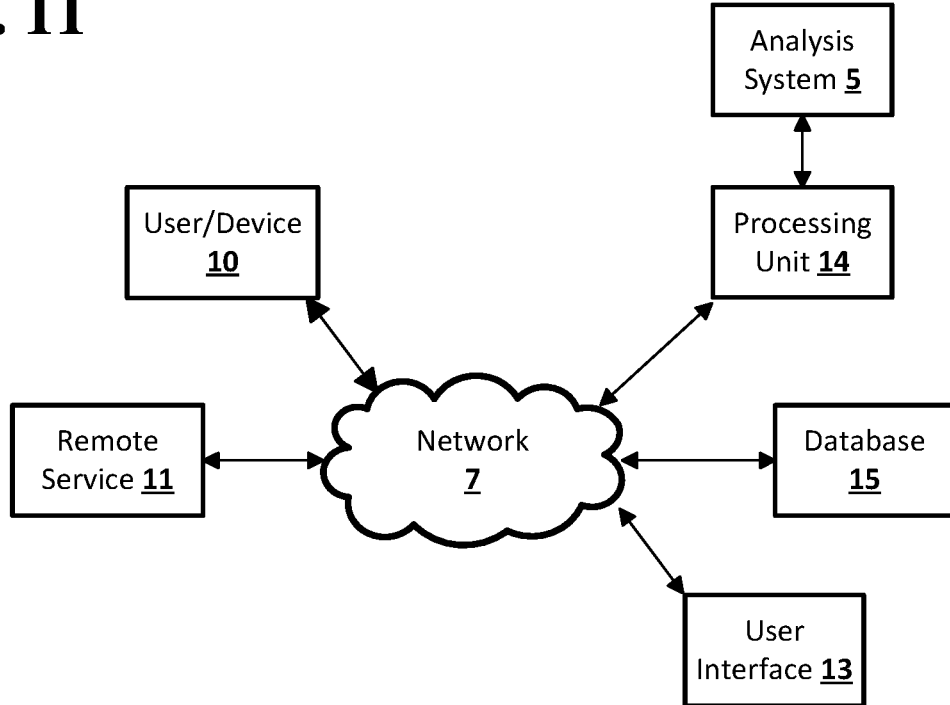
FIG. 11 shows a network configuration according to an embodiment of the disclosed subject matter.

FIG. 11 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
    receiving HDMI-CEC device control data from a connected electronic device, wherein the connected electronic device is connected to an electronic display device over an HDMI connection, and wherein the HDMI-CEC device control data is based on an HDMI-CEC device control signal sent from the electronic display device to the connected electronic device;
    receiving signals from one or more sensor devices located in a same environment as the electronic display device;
    generating, with a machine learning system, a control signal for a device within the same environment as the electronic display device and the one or more sensor devices, wherein the HDMI-CEC device control data from the connected electronic device and the signals from the one or more sensor devices are input to the machine learning system; and
    sending the control signal to the device to be implemented by the device.

2. The computer-implemented method of claim 1, further comprising:
    generating, with the machine learning system, a recommendation for controlling a second device, wherein the HDMI-CEC device control data is input to the machine learning system; and
    sending the recommendation for controlling the second device to a user computing device.

3. The computer-implemented method of claim 2, further comprising:
    receiving, from the user computing device, a selection of a control for the recommendation for controlling the second device;
    generating a control signal for the second device, wherein the control signal is based on the recommendation for controlling the second device; and
    sending the control signal to the second device to be implemented by the second device.

4. The computer-implemented method of claim 1, further comprising:
    generating, with the machine learning system, a recommendation for content to be displayed on the electronic display device, wherein the recommendation is based on times at which HDMI-CEC device control data based on HDMI-CEC device control signals from the electronic display device are received; and
    sending the recommendation for content to a user computing device.

5. The computer-implemented method of claim 1, wherein the control signal causes electronic communications intended for a user computing device to be displayed on the electronic display device.

6. The computer-implemented method of claim 1, wherein the control signal causes a video signal from the device to be displayed on the electronic display device.

7. The computer-implemented method of claim 1, wherein the HDMI-CEC device control signal comprises a signal according to HDMI-CEC indicating a status of the electronic display device.

8. The computer-implemented method of claim 1, wherein the machine learning system implements online learning.

9. A computer-implemented system for automation and recommendation based on device control protocols comprising:
    a connected electronic device connected to an electronic display device; and
    a computing device of a cloud server system configured to receive HDMI-CEC device control data from the connected electronic device, wherein the connected electronic device is connected to an electronic display device over an HDMI connection, and wherein the HDMI-CEC device control data is based on an HDMI-CEC device control signal sent from the electronic display device to the connected electronic device, receive signals from one or more sensor devices located in a same environment as the electronic display device, generate, with a machine learning system, a control signal for a device within the same environment as the electronic display device and the one or more sensor devices, wherein the HDMI-CEC device control data from the connected electronic device and signals from the one or more sensor devices are input to the machine learning system, and send the control signal to the device to be implemented by the device.

10. The computer-implemented system of claim 9, wherein the computing device of the cloud server system is further configured to generate, with the machine learning system, a recommendation for controlling a second device, wherein the HDMI-CEC device control data is input to the machine learning system, and send the recommendation for controlling the second device to a user computing device.

11. The computer-implemented system of claim 10, wherein the computing device of the cloud server system is further configured to receive, from the user computing device, a selection of a control for the recommendation for controlling the second device, generate a control signal for the second device, wherein the control signal is based on the recommendation for controlling the second device, send the control signal to the second device to be implemented by the second device.

12. The computer-implemented system of claim 9, wherein the computing device of the cloud server system is further configured to generate, with the machine learning system, a recommendation for content to be displayed on the electronic display device, wherein the recommendation is based on times at which HDMI-CEC device control data based on HDMI-CEC device control signals from the electronic display device are received, and send the recommendation for content to a user computing device.

13. The computer-implemented system of claim 9, wherein the control signal causes electronic communications intended for a user computing device to be displayed on the electronic display device.

14. The computer-implemented system of claim 9, wherein the control signal causes a video signal from the device to be displayed on the electronic display device.

15. The computer-implemented system of claim 9, wherein the HDMI-CEC device control signal comprises a signal according to HDMI-CEC indicating a status of the electronic display device.

16. The computer-implemented system of claim 9, wherein the machine learning system implements online learning.

17. A system comprising: one or more computers and one or more storage devices storing instructions which are operable, when executed by the one or more computers, to cause the one or more computers to perform operations comprising:
   receiving HDMI-CEC device control data from a connected electronic device, wherein the connected electronic device is connected to an electronic display device over an HDMI connection, and wherein the HDMI-CEC device control data is based on an HDMI-CEC device control signal sent from the electronic display device to the connected electronic device;
   receiving signals from one or more sensor devices located in a same environment as the electronic display device;
   generating, with a machine learning system, a control signal for a device within the same environment as the electronic display device and the one or more sensor devices, wherein the HDMI-CEC device control data from the connected electronic device and signals from the one or more sensor devices are input to the machine learning system; and
   sending the control signal to the device to be implemented by the device.

18. The system of claim 17, wherein the instructions further cause the one or more computers to perform operations comprising:
   generating, with the machine learning system, a recommendation for controlling a second device, wherein the HDMI-CEC device control data is input to the machine learning system; and
   sending the recommendation for controlling the second device to a user computing device.

19. The system of claim 18, wherein the instructions further cause the one or more computers to perform operations comprising:
   receiving, from the user computing device, a selection of a control for the recommendation for controlling the second device;
   generating a control signal for the second device, wherein the control signal is based on the recommendation for controlling the second device; and
   sending the control signal to the second device to be implemented by the second device.

20. The system of claim 17, wherein the instructions further cause the one or more computers to perform operations comprising:
   generating, with the machine learning system, a recommendation for content to be displayed on the electronic display device, wherein the recommendation is based on times at which HDMI-CEC device control data based on HDMI-CEC device control signals from the electronic display device are received; and
   sending the recommendation for content to a user computing device.

* * * * *